United States Patent
Suzuki et al.

(10) Patent No.: US 10,989,433 B2
(45) Date of Patent: Apr. 27, 2021

(54) AIR CONDITIONER

(71) Applicant: Johnson Controls-Hitachi Air Conditioning Technology (Hong Kong) Limited, Hong Kong (CN)

(72) Inventors: Natsuko Suzuki, Tokyo (JP); Koji Naito, Tokyo (JP); Kenji Matsumura, Tokyo (JP); Kazumoto Urata, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 594 days.

(21) Appl. No.: 15/529,115

(22) PCT Filed: Nov. 26, 2014

(86) PCT No.: PCT/JP2014/081141
§ 371 (c)(1),
(2) Date: May 24, 2017

(87) PCT Pub. No.: WO2016/084139
PCT Pub. Date: Jun. 2, 2016

(65) Prior Publication Data
US 2017/0284717 A1    Oct. 5, 2017

(51) Int. Cl.
*F25B 47/02* (2006.01)
*F24F 11/89* (2018.01)
(Continued)

(52) U.S. Cl.
CPC ............ *F24F 11/89* (2018.01); *F24F 1/0003* (2013.01); *F24F 11/30* (2018.01); *F24F 11/42* (2018.01);
(Continued)

(58) Field of Classification Search
CPC .................................. F24F 11/17; F24F 11/42
See application file for complete search history.

(56) References Cited

U.S. PATENT DOCUMENTS 5,799,498 A * 9/1998 Park .................. F25D 21/02
62/140

FOREIGN PATENT DOCUMENTS

EP    2 012 078 A1    1/2009
EP    2 436 999 A1    4/2012
(Continued)

OTHER PUBLICATIONS

International Search Report of PCT/JP2014/081141 dated Mar. 3, 2015.
(Continued)

*Primary Examiner* — Elizabeth J Martin
*Assistant Examiner* — Nael N Babaa
(74) *Attorney, Agent, or Firm* — Mattingly & Malur, PC

(57) ABSTRACT

An air conditioner 1 includes: an outdoor heat exchanger 14; an outdoor fan 12 for blowing air to the outdoor heat exchanger; an outdoor fan motor 20 that drives the outdoor fan; an outdoor fan inverter 21 that drives the outdoor fan motor; and a control unit 31 that generates a rotation-speed command voltage for controlling the rotation number of the outdoor fan motor. In addition, the control unit starts a defrost operation of the outdoor heat exchanger, based on the rotation-speed command voltage. In this manner, it is possible to achieve an outdoor device of an air conditioner in which there is no need to provide a current detecting sensor, and it is possible to detect frost formation over the heat exchanger during a heating operation and to perform a defrost operation at low costs.

8 Claims, 7 Drawing Sheets

(51) Int. Cl.
*F24F 11/30* (2018.01)
*F24F 11/77* (2018.01)
*F24F 11/65* (2018.01)
*F24F 11/42* (2018.01)
*F24F 1/0003* (2019.01)

(52) U.S. Cl.
CPC .............. *F24F 11/65* (2018.01); *F24F 11/77* (2018.01); *F25B 47/02* (2013.01); *F25B 47/025* (2013.01); *F25B 2313/0294* (2013.01); *F25B 2500/05* (2013.01); *F25B 2700/173* (2013.01)

(56) References Cited

FOREIGN PATENT DOCUMENTS

| EP | 2436999 A1 * | 4/2012 | .............. F25B 13/00 |
|---|---|---|---|
| JP | 60-144546 A | 7/1985 | |
| JP | 64-46530 A | 2/1989 | |
| JP | 6-307701 A | 11/1994 | |
| JP | 10-246542 A | 9/1998 | |
| JP | 11-94329 A | 4/1999 | |
| JP | 2003-050066 A | 2/2003 | |
| JP | 2008-232500 A | 10/2008 | |
| JP | 2013-242097 A | 12/2013 | |

OTHER PUBLICATIONS

Extended European Search Report received in corresponding European Application No. 14906891.8 dated Jun. 18, 2018.
Japanese Office Action received in corresponding Japanese Application No. 2016-561120 dated Mar. 6, 2018.

* cited by examiner

[FIG. 1]
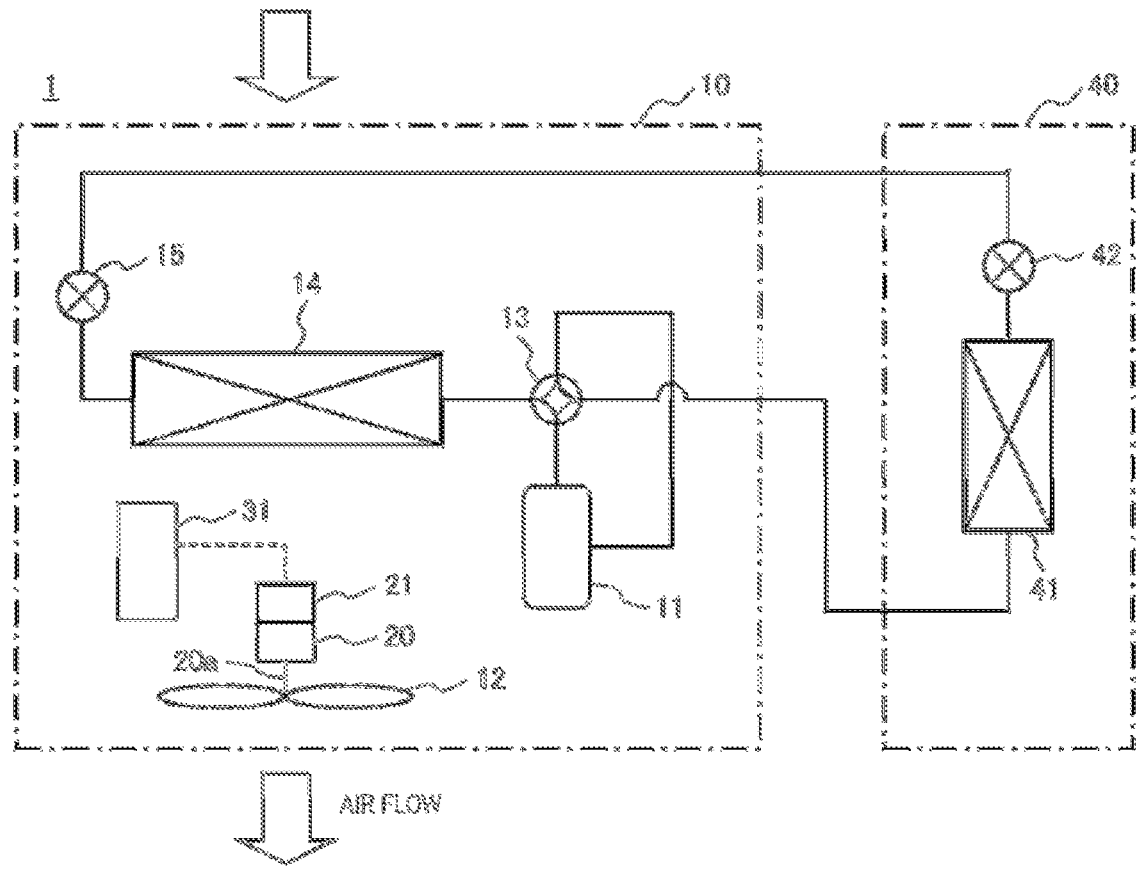
[FIG. 2]
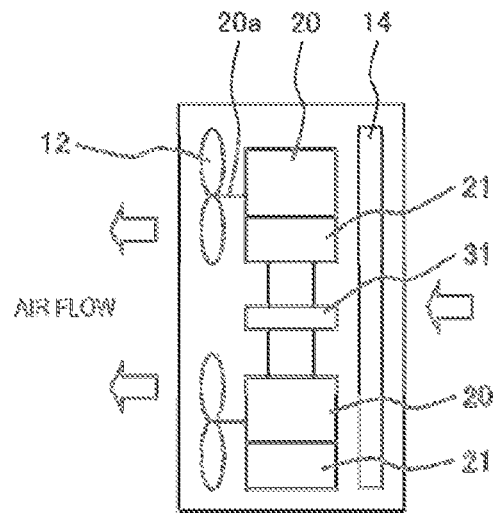

[FIG. 3]
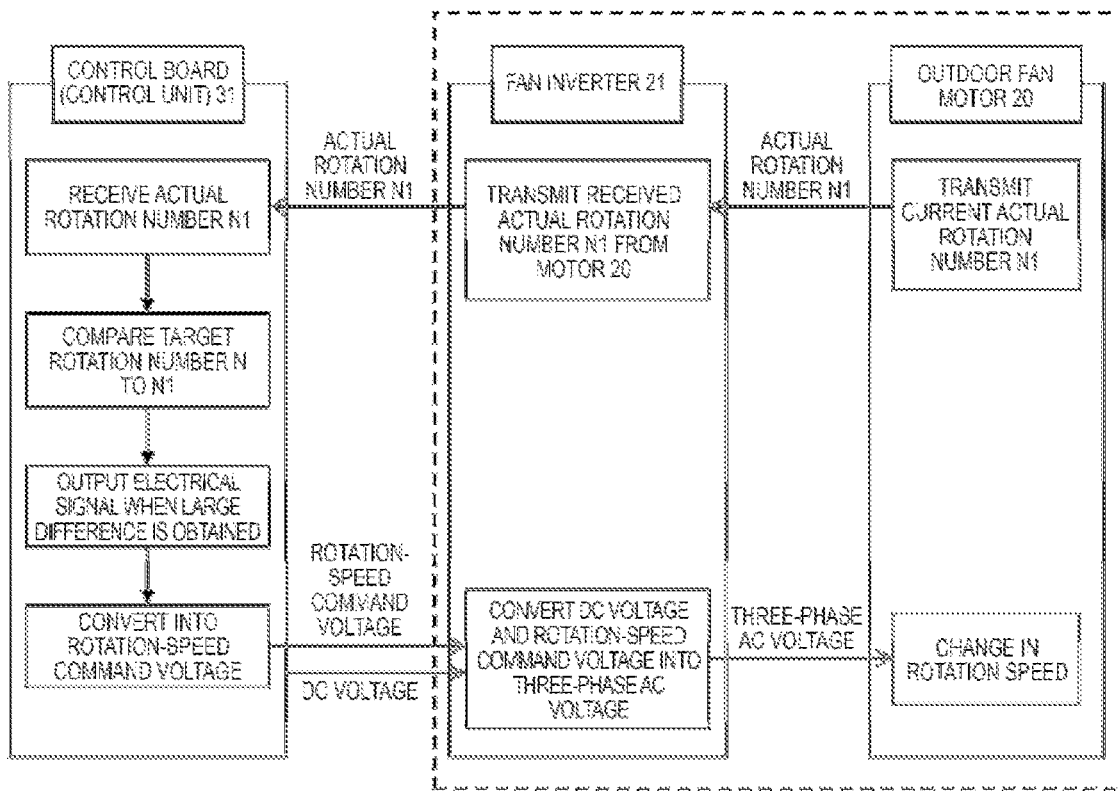
[FIG. 4]
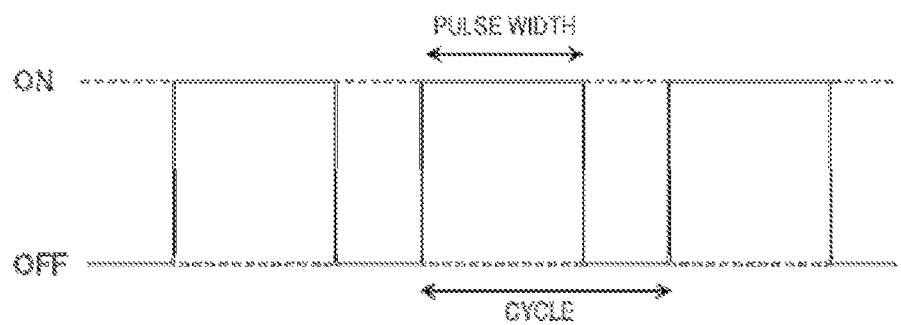

[FIG. 5]
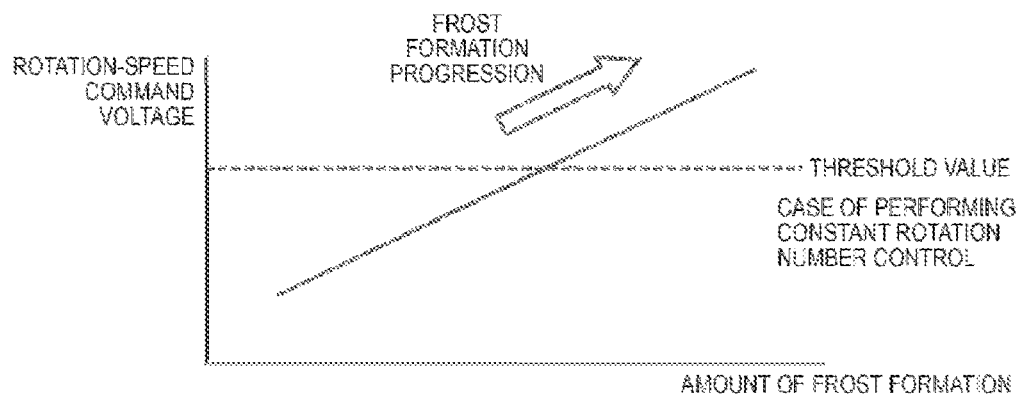
[FIG. 6]
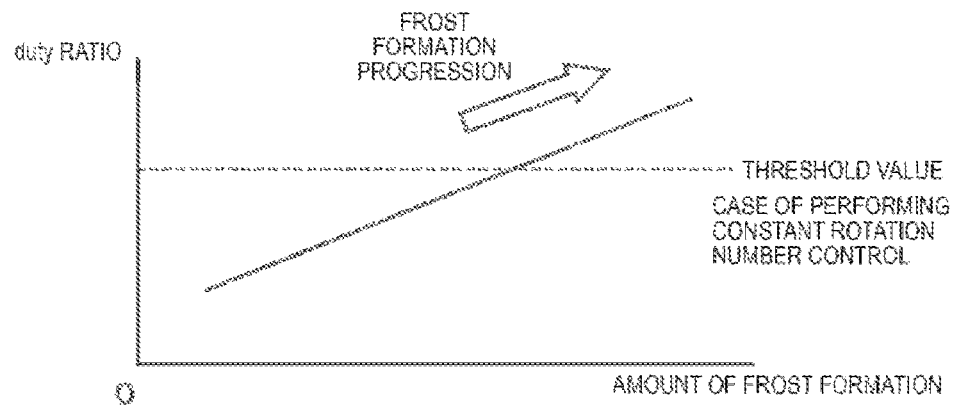

[FIG. 7]
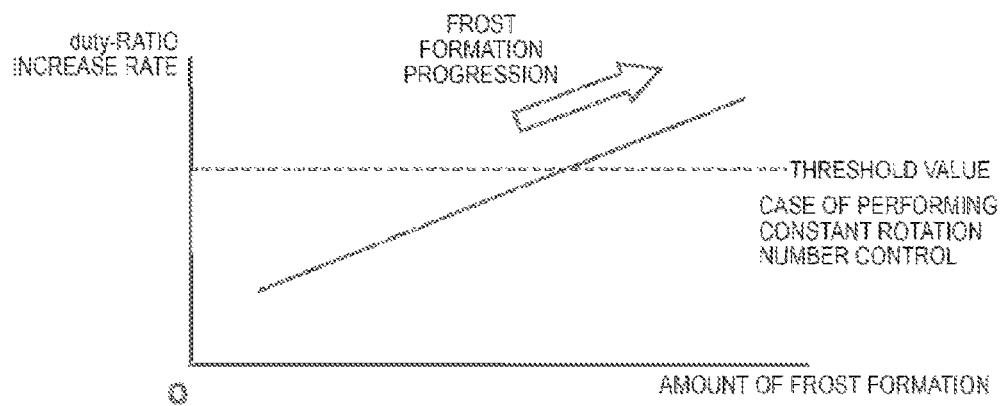
[FIG. 8]
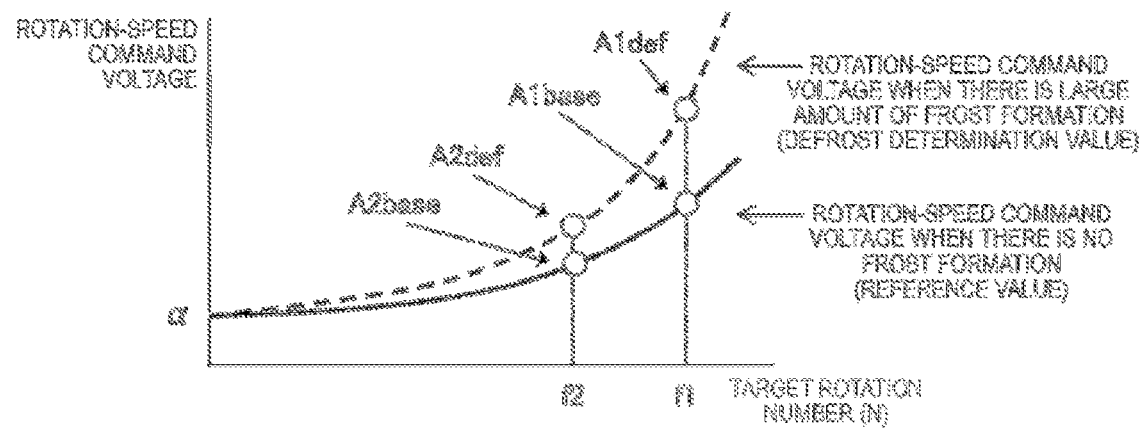

[FIG. 9]
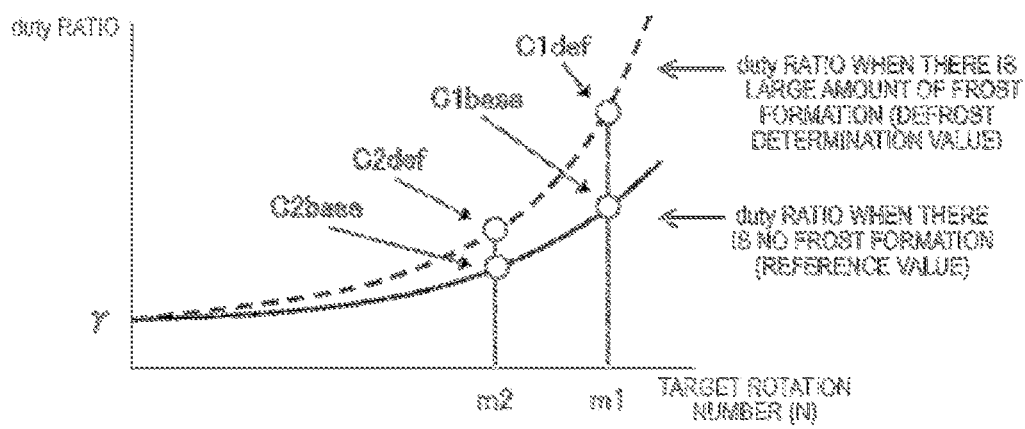
[FIG. 10]
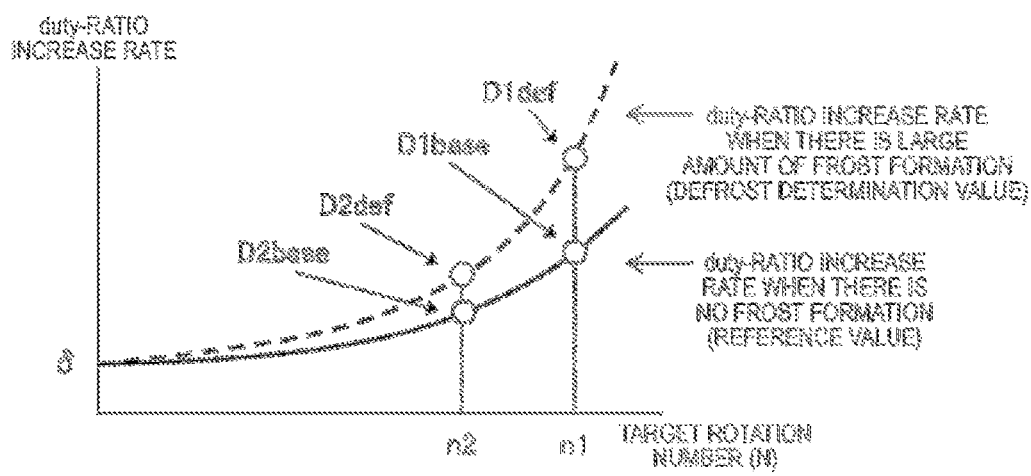

[FIG. 11]
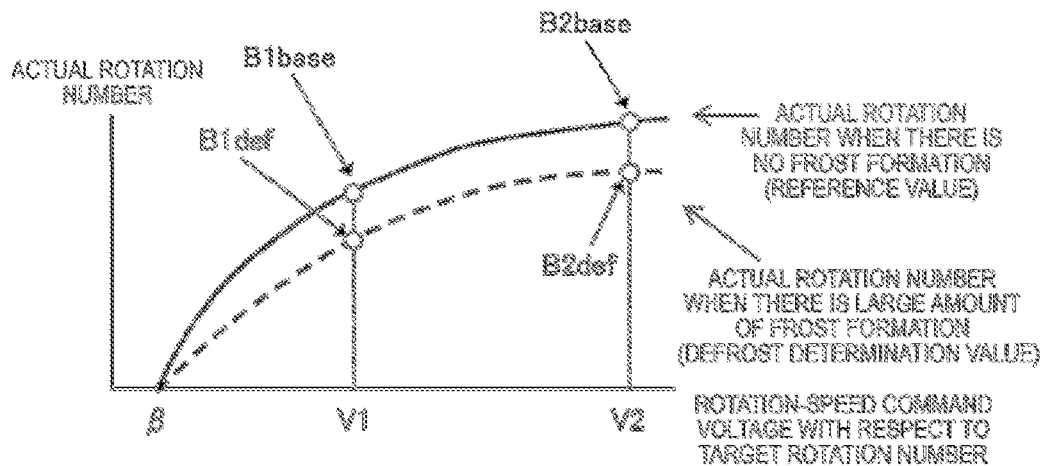
[FIG. 12]
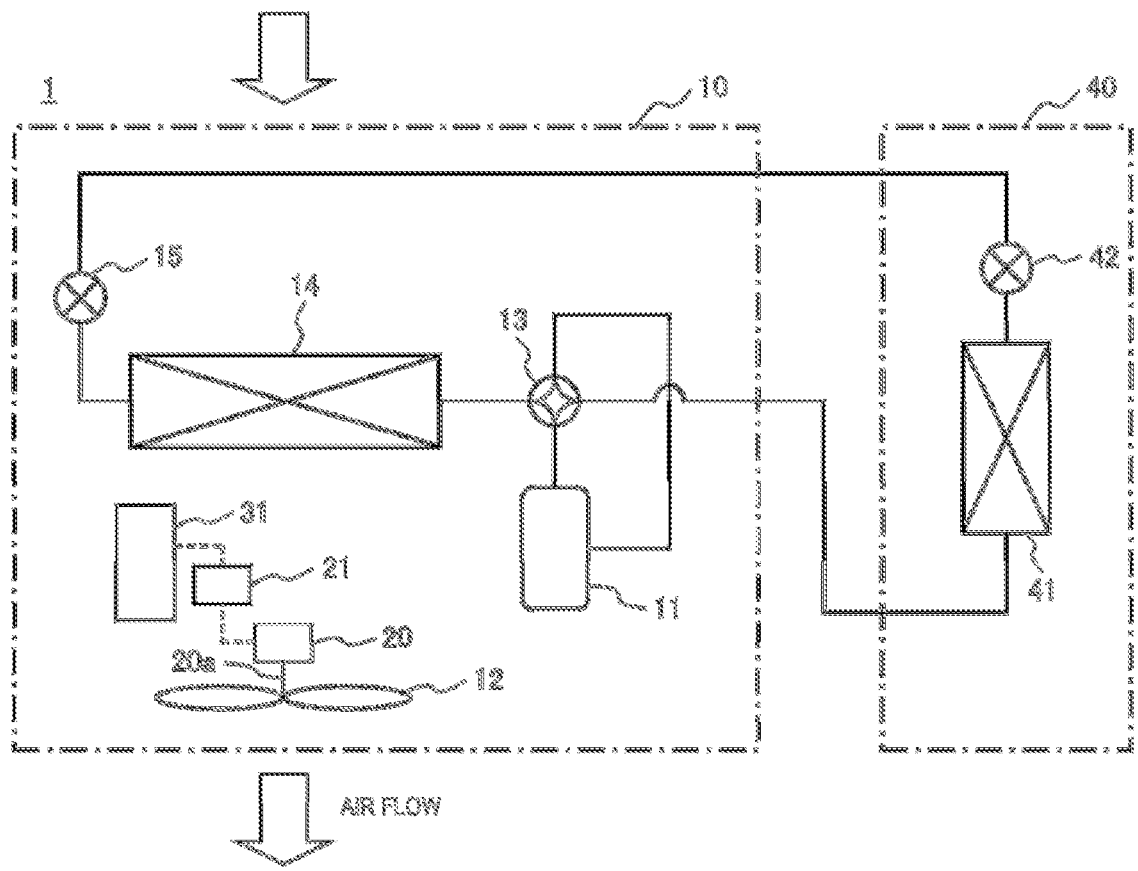

[FIG. 13]
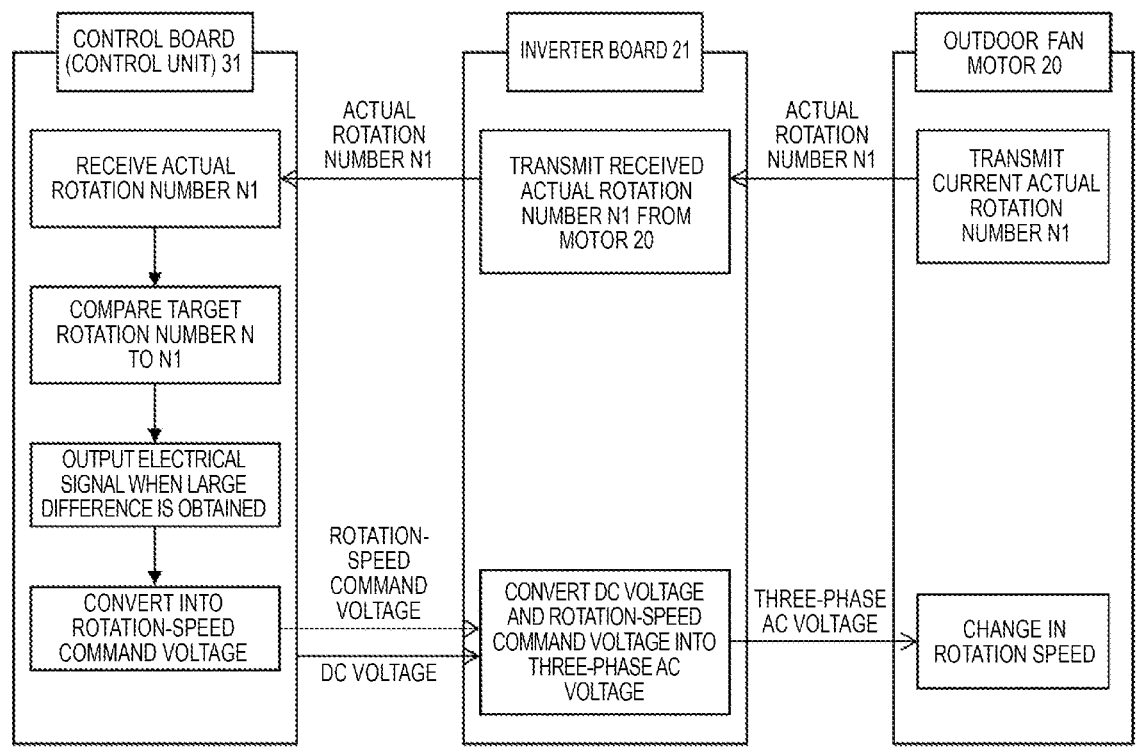

AIR CONDITIONER

TECHNICAL FIELD

The present invention relates to an air conditioner, particularly, to an air conditioner in which frost formation on an outdoor heat exchanger of an outdoor device is detected during a heating operation and defrost is performed.

BACKGROUND ART

As an air conditioner in the related art in which frost formation on an outdoor heat exchanger of an outdoor device is detected during a heating operation and defrost is performed, an air conditioner is disclosed in JP-A-60-144546 (PTL 1). PTL 1 discloses the air conditioner in which a current of an outdoor air blower (outdoor fan) that performs blowing of air to an outdoor heat exchanger is measured, thereby frost formation on the outdoor heat exchanger during a heating operation is detected, and a defrost operation is performed. In other words, such technology, in which an increase in the current of an outdoor fan motor is detected, thereby frost formation on a heat exchanger is estimated, and the defrost operation is performed, has been known.

CITATION LIST

Patent Literature

PTL 1: JP-A-60-144546

SUMMARY OF INVENTION

Technical Problem

In a heating operation condition, when a rotation number of the outdoor fan is controlled to be constant and an amount of frost formation on the outdoor heat exchanger increases, the current (fan current) of the outdoor fan motor increases in response to the increase in the amount. Therefore, the detection of the increase in the current of the outdoor fan motor enables the frost formation on the heat exchanger to be detected (estimated), and enable determination of whether or not the defrost operation needs to be performed.

It is possible to detect the fan current by an inverter board (inverter unit) for driving a control board (control unit) or the outdoor fan motor which is provided in the outdoor device. However, in order to detect the fan current, it is necessary to provide a current detecting sensor, and thus there arises a problem of an increase in costs.

An object of the present invention is to obtain an outdoor device of an air conditioner in which there is no need to provide a current detecting sensor and it is possible to detect frost formation on a heat exchanger during a heating operation and to perform a defrost operation at low costs.

Solution to Problem

In order to achieve the object, according to an aspect of the present invention, there is provided an air conditioner including: an outdoor heat exchanger; an outdoor fan for blowing air to the outdoor heat exchanger; an outdoor fan motor that drives the outdoor fan; an outdoor fan inverter that drives the outdoor fan motor; and a control unit that generates a rotation-speed command voltage for controlling the rotation number of the outdoor fan motor. The control unit starts a defrost operation of the outdoor heat exchanger, based on the rotation-speed command voltage.

According to another aspect of the present invention, there is provided an air conditioner including: an outdoor heat exchanger; an outdoor fan for blowing air to the outdoor heat exchanger; an outdoor fan motor that drives the outdoor fan; an outdoor fan inverter that drives the outdoor fan motor; and a control unit that generates a rotation-speed command voltage for controlling the rotation number of the outdoor fan motor. The control unit starts the defrost operation of the outdoor heat exchanger, based on a duty ratio for generating the rotation-speed command voltage, or an increase rate of a duty ratio.

According to still another aspect of the present invention, there is provided an air conditioner including: an outdoor heat exchanger; an outdoor fan for blowing air to the outdoor heat exchanger; an outdoor fan motor that drives the outdoor fan; an outdoor fan inverter that drives the outdoor fan motor; and a control unit that generates a rotation-speed command voltage for controlling the rotation number of the outdoor fan motor. The actual rotation number of the outdoor fan motor is detected and is subjected to feedback to the control unit. The control unit starts the defrost operation of the outdoor heat exchanger, in a case where the actual rotation number of the outdoor fan motor that is subjected to feedback decreases by a value or larger than or equal to a predetermined value with respect to a target rotation number, based on the rotation-speed command voltage.

Advantageous Effects of Invention

According to the present invention, effects of achieving an outdoor device of the air conditioner, in which there is no need to provide a current detecting sensor, and it is possible to detect frost formation over the heat exchanger during the heating operation and to perform a defrost operation at low costs, are obtained.

BRIEF DESCRIPTION OF DRAWINGS

FIG. 1 is a diagram of a refrigeration cycle system illustrating Example 1 of an air conditioner according to the present invention.

FIG. 2 is a diagram schematically illustrating an example of an outdoor device illustrated in FIG. 1.

FIG. 3 is a block diagram illustrating control flow of an outdoor fan illustrated in FIG. 1.

FIG. 4 is a diagram illustrating an example of a waveform of a duty ratio for generating a rotation-speed command voltage.

FIG. 5 is a diagram illustrating a relationship between the rotation-speed command voltage and an amount of frost formation.

FIG. 6 is a diagram illustrating a relationship between a duty ratio of the rotation-speed command voltage and the amount of frost formation.

FIG. 7 is a diagram illustrating a relationship between an increase rate of the duty ratio of the rotation-speed command voltage and the amount of frost formation.

FIG. 8 is a diagram illustrating a relationship between the rotation-speed command voltage with respect to a target rotation number, by comparing cases of no frost formation and a large amount of frost formation.

FIG. 9 is a diagram illustrating a relationship between the target rotation number and a duty ratio determined such that the target rotation number is obtained, by comparing cases of no frost formation and a large amount of frost formation.

FIG. 10 is a diagram illustrating a relationship between the target rotation number and a duty-ratio increase rate that increases such that the target rotation number is obtained, by comparing cases of no frost formation and a large amount of frost formation.

FIG. 11 is a diagram illustrating a relationship between an actual rotation number and a rotation-speed command voltage with respect to the target rotation number, by comparing cases of no frost formation and a large amount of frost formation.

FIG. 12 is a diagram of a refrigeration cycle system illustrating Example 2 of an air conditioner according to the present invention.

FIG. 13 is a block diagram illustrating control flow of an outdoor fan illustrated in FIG. 12.

DESCRIPTION OF EMBODIMENTS

Hereinafter, specific examples of an air conditioner of the present invention will be described with reference to the figures. In the figures, the portions assigned with the same reference signs are the same or corresponding portions.

Example 1

Example 1 of the air conditioner of the present invention will be described with reference to FIGS. 1 to 11.

FIG. 1 is a diagram of a refrigeration cycle system illustrating Example 1 of the air conditioner according to the present invention, and an example illustrated in FIG. 1 is a diagram obtained in a case where the air conditioner performs a heating operation.

As illustrated in FIG. 1, an air conditioner 1 is configured to include an outdoor device 10 and an indoor device 40. In this example, a case of having only one indoor device 40 is illustrated; however, it is possible to perform the same operation in a case of having a plurality of indoor devices 40.

During a heating operation, a high-temperature and high-pressure refrigerant gas discharged from a compressor 11 flows to the indoor device 40 side by a four-way valve 13, is subjected to heat exchange with the indoor air in an indoor heat exchanger 41, and is condensed into a high-pressure refrigerant liquid. On the other hand, air heated in the indoor heat exchanger 41 is blown to an indoor space and heats the indoor space.

The high-pressure refrigerant liquid from the indoor heat exchanger 41 passes through the indoor expansion valve 42 in a fully-opened state, then returns to the outdoor device 10 side, is subjected to pressure reduction in the outdoor expansion valve 15, is changed to a low-temperature and low-pressure refrigerant, and flows into the outdoor heat exchanger 14. In the outdoor heat exchanger 14, the low-temperature and low-pressure refrigerant is subjected to heat exchange with the outdoor air so as to absorb heat from the outdoor air, and is changed to a low-pressure refrigerant gas having high energy. On the other hand, the outdoor air cooled in the outdoor heat exchanger 14 is released to the outside air by the outdoor fan 12. The low-pressure refrigerant gas having high energy from the outdoor heat exchanger 14 is again suctioned to and is again compressed in the compressor 11 via the four-way valve, then is discharged from the compressor 11, and circulates. In this manner, the refrigeration cycle is configured.

During a cooling operation, the four-way valve 13 is switched to a state of the operation side such that the high-temperature and high-pressure refrigerant gas discharged from the compressor 11 first flows to the outdoor heat exchanger 14, and the refrigerant gas is subjected to the heat exchange with the outdoor air and is condensed. The condensed refrigerant liquid flows out from the outdoor heat exchanger 14 to the indoor device side, is subjected to pressure reduction in the indoor expansion valve 42, is changed to a low-temperature and low-pressure refrigerant, flows to the indoor heat exchanger 41, and is subjected to the heat exchange with the indoor air so as to cool the indoor air. Here, the refrigerant is changed to gas as a low-pressure refrigerant gas with high energy, and is again suctioned to and is compressed in the compressor 11. In this manner, the refrigeration cycle is configured.

During a defrost operation, the four-way valve 13 is switched from the state of the heating operation such that the high-temperature and high-pressure refrigerant gas discharged from the compressor 11 flows to the outdoor heat exchanger 14 which is frosted and melts the frost formed on a fin of the outdoor heat exchanger 14. Until almost all of the frost is melted, the defrost operation continues. When the frost is completely melted, the four-way valve 13 is switched to the heating operation side and the normal heating operation is resumed.

When the air conditioner performs the heating operation, the outdoor heat exchanger 14 is frosted in some cases. Then, it is necessary to perform the defrost operation in order to melt the frost; however, in order to start the defrost operation, it is necessary to provide frost-formation detecting means that detects a state of frost formation. As technology of the frost-formation detecting means in the related art, by using a state of an increase in a current (fan current) for driving the outdoor fan in response to progress of the frost formation, as in PTL 1 described above, the fan current is detected and determination of the frost formation is performed when the detected fan current exceeds a predetermined value.

However, in order to detect the fan current, it is necessary to provide a current detecting sensor, and thus there arises a problem of an increase in costs. In the example, there is no need to provide a current detecting sensor, and it is possible to detect frost formation on the heat exchanger during the heating operation at low costs.

In other words, the example employs a configuration in which a rotation speed (rotation number) of the outdoor fan is controlled to be constant with a rotation-speed command voltage, detection of the rotation-speed command voltage in the control enables the frost formation to be detected and the defrost determination to be performed. Hereinafter, the defrost determination of the example will be described.

The outdoor fan 12 blows air with rotation of vanes (fan) attached to a fan shaft (rotary shaft) 20a of an outdoor fan motor (fan motor) 20. The fan motor 20 is configured of a DC motor (brushless DC motor), an outdoor fan inverter (hereinafter, referred to as a fan inverter or an inverter board) 21 is connected to the fan motor 20, three-phase AC voltage (drive voltage of the fan) is applied to the fan motor 20 from the fan inverter 21, and thereby the fan motor 20 rotates.

Since the three-phase AC voltage is generated from DC voltage that is input to the fan inverter 21 and the rotation-speed command voltage, the rotation-speed command voltage is a voltage signal (rotation-speed command-voltage signal) for controlling a rotation speed (rotation number) of the fan motor 20 of the outdoor fan 12. The rotation-speed command-voltage signal and the DC voltage are generated in a control board (control unit) 31 and are input to the fan inverter 21.

FIG. 2 is a diagram schematically illustrating an example of the outdoor device 10 illustrated in FIG. 1. FIG. 1 illustrates only one outdoor fan 12; however, as illustrated in FIG. 2, the example employs a configuration in which a plurality of upper and lower outdoor fans 12 provided with the fan motor 20 and the fan inverter 21 are vertically provided, one control board 31 is connected to the plurality of the fan inverters 21, and the one control board 31 synchronously or asynchronously controls the plurality of fan motors 20. Reference sign 14 represents the outdoor heat exchanger, in the configuration, the plurality of outdoor fans 12 blow air to the outdoor heat exchanger 14, and the outdoor air flows as air flow represented by outline arrows in FIG. 2.

Next, with reference to FIG. 3, flow for obtaining a target rotation number by feedback of an actual rotation number of the outdoor fan 12 is described. FIG. 3 is a control block diagram illustrating control flow of the outdoor fan illustrated in FIG. 1, and illustrates an example of a case where the inverter board is mounted on the outdoor fan motor.

With reference to FIG. 3, flow of controlling to obtain the target rotation number by the feedback of the actual rotation number of the outdoor fan motor to an outdoor control board and outputting a new rotation-speed command voltage for obtaining the target rotation number is described.

As illustrated in FIG. 3, a current actual rotation number (actual rotation speed) N1 is subjected to feedback to the fan inverter 21 from the outdoor fan motor 20. Information of the rotation number is retransmitted to the control board (control unit) 31 and a target rotation number (target rotation speed) N is compared to the received current actual rotation number N1 in the control board 31. When a difference between the numbers is larger than or equal to a certain value, a value, which is referred to as a duty ratio as an electrical signal that causes the actual rotation number of the fan motor 20 to approximate to the target rotation number, is generated and output. Based on the electrical signal, in the control board 31, voltage is converted into a rotation-speed command voltage obtained by increasing or decreasing the rotation-speed command voltage.

The rotation-speed command voltage is a voltage signal for controlling the drive voltage for driving the outdoor fan 12, and is expressed as a product of the duty ratio and output voltage k (for example, 5 V or the like) obtained when the rotation-speed command voltage is high, as expressed in the following Expression (1).

$$\text{Rotation-Speed Command Voltage} = k \times \text{duty ratio} \quad (1)$$

Here, the duty ratio is described with reference to FIG. 4. FIG. 4 is a diagram illustrating an example of a waveform of the duty ratio for generating the rotation-speed command voltage.

The duty ratio is a ratio of a pulse width (hereinafter, referred to as duty) to a cycle in a duty signal in a waveform signal (duty signal) of the duty ratio illustrated in FIG. 4.

Voltage is converted into the rotation-speed command voltage by using Expression (1) above, based on the duty ratio, and the rotation-speed command voltage is transmitted to the fan inverter 21. Here, the speed command voltage and the DC voltage are converted into the three-phase AC voltage, and the three-phase AC voltage is transmitted to the outdoor fan motor 20. Since the fan motor 20 controls the rotation speed with the voltage, the fan motor receives the three-phase AC voltage, and then performs automatic processing on the voltage so as to adjust the rotation speed of the fan motor 20.

When the control is performed as illustrated in FIG. 3, as illustrated in FIG. 5, the rotation-speed command voltage tends to increase as the frost formation progresses on the outdoor heat exchanger 14 and an amount of the frost formation increases. This is because a load applied to the outdoor fan 12 increases when the frost formation progresses. Thus, in a case where the same electricity is input, the load increases and the rotation number decreases. Therefore, the control board 31 operates in a direction in which the rotation number is increased to return to the target rotation number, and the speed command voltage increases.

Since the control board 31 generates the rotation-speed command voltage, a use of the generated rotation-speed command voltage enables estimation of a frost-formation state on the outdoor heat exchanger 14 from a relationship illustrated in FIG. 5. In other words, in a case where a value of the rotation-speed command voltage is larger than a threshold value (predetermined value) illustrated in the figure, it is possible to estimate that the amount of frost formation increases to be larger than or equal to a certain value. Hence, Example 1 employs a configuration in which the control board 31 determines whether or not the rotation-speed command voltage exceeds the predetermined value set in advance, and the defrost operation is started when the rotation-speed command voltage exceeds the predetermined value (threshold value).

According to the example, since the control board 31 is capable of determining the frost formation by using the generated rotation-speed command voltage, there is no need to provide a current detecting sensor for detecting the frost formation as in the related art, and thus it is possible to detect the frost formation at low costs.

In a case where a certain rotation-speed command voltage is transmitted to the fan inverter 21, a use of a decrease in the rotation number subjected to the feedback also enables detection of the frost formation. In other words, in the example, as illustrated in FIG. 3, since the control board 31 obtains the current actual rotation number N1 subjected to the feedback from the fan motor 20, a use of an actual-rotation-number decreasing phenomenon of the fan motor 20 due to the frost formation enables detection of the frost formation. For example, it is possible for the control board 31 to be configured to detect the frost formation in a case where the actual rotation number N1 of the fan motor 20, which is subjected to the feedback from the fan motor 20, decreases to be smaller than or equal to the predetermined value with respect to the target rotation number N.

Even in such a configuration, there is no need to provide a current detecting sensor for detecting the frost formation, and thus it is possible to detect the frost formation at low costs.

In addition, in the example, the case of detecting the frost formation by using the rotation-speed command voltage is described; however, since there is a one-to-one correspondence between the rotation-speed command voltage and the duty ratio as expressed in Expression (1) above, and such a relationship is a proportional relationship, the frost formation may be detected by using the duty ratio. In addition, a relationship between the speed command voltage and the amount of frost formation illustrated in FIG. 5 tends to be the same as a relationship between the duty ratio and the amount of frost formation illustrated in FIG. 6. FIG. 6 is a simplified diagram illustrating the relationship between the duty ratio of the speed command voltage and the amount of frost formation.

The relationship between the speed command voltage and the duty ratio is as expressed in Expression (1) above, and the relationship between the duty ratio and the amount of frost formation is as illustrated in FIG. 6. Hence, similar to the case where the frost formation is detected by using the speed command voltage, it is also possible to detect the frost formation by using the duty ratio, and determination (estimation) of the frost formation may be performed in a case where the duty ratio is larger than the predetermined threshold value (predetermined value) and then the defrost operation may be performed.

FIG. 7 is a diagram illustrating a relationship between an increase rate of the duty ratio of the rotation-speed command voltage and the amount of frost formation. FIG. 7 has the same tendency of a relationship as that in FIG. 6 except for only differences of a unit or order of numbers. Hence, similar to the case where the frost formation is detected by using the speed command voltage or the duty ratio, it is also possible to detect the frost formation by using the increase rate of the duty ratio, and determination (estimation) of the frost formation may be performed in a case where the increase rate of the duty ratio is larger than the predetermined threshold value (predetermined value) and then the defrost operation may be performed.

As described above, the control board 31 may detect the frost formation by using the actual-rotation-number decreasing phenomenon of the fan motor 20 or using the duty ratio of the rotation-speed command voltage or a duty-ratio increase rate, instead of the detection of the frost formation by using the rotation-speed command voltage.

FIG. 8 is a diagram illustrating a relationship between the rotation-speed command voltage with respect to the target rotation number by comparing cases of no frost formation and a large amount of frost formation. The solid line represents the rotation-speed command voltage with respect to the target rotation number in the case of no frost formation as a reference, and is characterized in that the speed command voltage increases as the target rotation number increases. In addition, the dashed line represents the rotation-speed command voltage with respect to the target rotation number in the case of the large amount of frost formation as a defrost determination value obtained when there is a very large amount of frost formation. As illustrated in FIG. 8, with the same target rotation number, the rotation-speed command voltage obtained in the case of the frost formation on the outdoor heat exchanger 14 is compared to the rotation-speed command voltage in the case of no frost formation, and the voltage value is found to increase.

A case where the rotation-speed command voltage increases more than the value of the rotation-speed command voltage represented by the dashed line indicates that the amount of frost formation excessively increases such that the performance of the outdoor heat exchanger is remarkably degraded, and indicates that the defrost operation needs to be performed. In other words, when the rotation-speed command voltage obtained in the case of the large amount of frost formation represented by the dashed line is a set value (defrost determination value) indicating that the defrost operation is started, and the rotation-speed command voltage obtained in the case of no frost formation represented by the solid line is a reference value indicating that the defrost operation does not need to be started, FIG. 8 illustrates a state in which, although the frost formation progresses between the defrost determination value and the reference value, the progress does not reach a point at which the defrost operation needs to be performed.

Next, specific examples of the frost formation and the defrost determination are described. In the example illustrated in FIG. 8, the rotation-speed command voltage is calculated by using the duty ratio as expressed in Expression (1) above. The control board (control unit) 31 controls the air conditioner such that the defrost operation of the outdoor heat exchanger 14 is started, based on the rotation-speed command voltage that is calculated during the heating operation. Since no frost is formed in an early stage of the heating operation in a case where the target rotation number N of the outdoor fan 12 is f1, a calculated rotation-speed command voltage A1 is substantially equal to the speed command voltage of the reference value (A1≅A1base).

When the frost formation progresses, the target rotation number N is maintained to be f1. Therefore, the calculated rotation-speed command voltage A1 also increases. In a case where the calculated rotation-speed command voltage A1 is larger than or equal to the defrost determination value represented by the dashed line (A1≥A1def), the control board (control unit) 31 determines that the amount of frost formation increases to be large and the defrost operation needs to be performed, and starts the defrost operation of the outdoor heat exchanger 14.

Here, in a case where the reference value represented by the solid line or the defrost determination value represented by the dashed line are maintained as they are, and the target rotation number N of the outdoor fan 12 decreases from f1 to f2, the speed command voltage more decreases as the reference value represented by the solid line in the early stage of the heating operation (case of no frost formation). When the rotation-speed command voltage is calculated to be A2 in a case where the target rotation number N is f2, a relationship of A2<A1base is satisfied. Even when the frost formation progresses and the rotation-speed command voltage A2 increases, the voltage is substantially equal to the reference value A1base (A2≅A1base), and is smaller than the defrost determination value A1def (A2<A1def). Therefore, the defrost operation does not need to be started even when the frost formation progresses.

In the example, in order to prevent such a phenomenon from happening, in a case where the target rotation number N changes, a reference value (A2base) and a defrost determination value (A2def) are set to correspond to the changed target rotation number N. In other words, in the example, the defrost determination value of the rotation-speed command voltage is set to increase as the target rotation number of the outdoor fan 12 increases.

To be specifically described, as illustrated in FIG. 8, the first reference value (A1base) and the second reference value (A2base) that is smaller than the first reference value are set as the reference values of the no-frost-formation state, corresponding to the first target rotation number f1 and the second target rotation number f2 that is smaller than the first target rotation number f1 of the outdoor fan motor 20, respectively.

In addition, the first defrost determination value (A1def) that is larger than the first reference value (A1base) is set as the defrost determination value of the frost-formation state, corresponding to the first target rotation number f1 of the outdoor fan motor 20. Further, the second defrost determination value (A2def) that is larger than the second reference value (A2base) and smaller than the first defrost determination value (A1def) is set as the defrost determination value of the frost-formation state, corresponding to the target second rotation number f2 of the outdoor fan motor 20.

In a case where the rotation number of the outdoor fan motor 20 during the heating operation is equal to the first rotation number f1, the control board (control unit) 31 starts the defrost operation of the outdoor heat exchanger 14 in a case where the detected rotation-speed command voltage is larger than or equal to the first defrost determination value (A1def). In addition, in a case where the rotation number of the outdoor fan motor 20 is equal to the second rotation number f2, the defrost operation of the outdoor heat exchanger 14 is started in a case where the calculated speed command voltage value is larger than or equal to the second defrost determination value (A2def).

In the illustration in FIG. 8, the example, in which, when the rotation-speed command voltage is calculated and obtained from the duty ratio and the rotation-speed command voltage is larger than the predetermined value, the defrost operation is started, is described; however, as described above, since the rotation-speed command voltage and the duty ratio have a proportional relationship, it is possible to perform the same operations as in the example illustrated in FIG. 8 even in the case where the defrost determination is performed by using the duty ratio or the increase rate of the duty ratio, instead of the calculation of the rotation-speed command voltage. Hereinafter, description is provided with reference to FIGS. 9 and 10.

FIG. 9 is a diagram illustrating a relationship between the target rotation number and the duty ratio determined to obtain the target rotation number by comparing cases of no frost formation and a large amount of frost formation. The solid line represents the duty ratio with respect to the target rotation number N in the case of no frost formation as a reference, and is characterized in that the duty ratio increases as the target rotation number increases. In addition, the dashed line represents the duty ratio with respect to the target rotation number N in the case of the large amount of frost formation as a defrost determination value obtained when there is a very large amount of frost formation.

A first reference value (C1base) and a second reference value (C2base) that is smaller than the first reference value are set as the reference values of the no-frost-formation state, corresponding to a first target rotation number m1 and a second target rotation number m2 that is smaller than the first target rotation number m1 of the outdoor fan motor 20, respectively.

In addition, a first defrost determination value (C1def) that is larger than the first reference value (C1base) is set as the defrost determination value of the frost-formation state, corresponding to the first target rotation number m1 of the outdoor fan motor 20. Further, a second defrost determination value (C2def) that is larger than the second reference value (C2base) and smaller than the first defrost determination value (C1def) is set as the defrost determination value of the frost-formation state, corresponding to the second target rotation number m2 of the outdoor fan motor 20. The other configurations are the same as illustrated in FIG. 8, and thus the description thereof is omitted.

FIG. 10 is a diagram illustrating a relationship between the target rotation number and the duty-ratio increase rate that increases to obtain the target rotation number by comparing cases of no frost formation and the large amount of frost formation. The solid line represents the duty-ratio increase rate with respect to the target rotation number N in the case of no frost formation as a reference, and is characterized in that the duty-ratio increase rate increases as the target rotation number increases. In addition, the dashed line represents the duty-ratio increase rate with respect to the target rotation number N in the case of the large amount of frost formation as the defrost determination value obtained when there is a very large amount of frost formation.

A first reference value (D1base) and a second reference value (D2base) that is smaller than the first reference value are set as the reference values of the no-frost-formation state, corresponding to a first target rotation number n1 and a second target rotation number n2 that is smaller than the first target rotation number n1 of the outdoor fan motor 20, respectively.

In addition, a first defrost determination value (D1def) that is larger than the first reference value (D1base) is set as the defrost determination value of the frost-formation state, corresponding to the first target rotation number n1 of the outdoor fan motor 20. Further, a second defrost determination value (D2def) that is larger than the second reference value (D2base) and smaller than the first defrost determination value (D1def) is set as the defrost determination value of the frost-formation state, corresponding to the second target rotation number n2 of the outdoor fan motor 20. The other configurations are the same as illustrated in FIG. 8, and thus the description thereof is omitted.

In other words, as illustrated in FIGS. 9 and 10, a relationship between the duty ratio and the target rotation number N, or a relationship between the duty-ratio increase rate and the target rotation number N is the same relationship between the rotation-speed command voltage and the target rotation number N, and thus, similar to the case of the defrost determination at the rotation-speed command voltage, it is possible to perform the defrost determination by using the duty ratio or the duty-ratio increase rate.

When a configuration, in which it is possible to detect the rotation-speed command voltage by using a detector or the like is employed, it is also possible to perform the same determination as described above with the detector directly measuring the rotation-speed command voltage without calculating the rotation-speed command voltage from the duty ratio.

Next, instead of performing the defrost determination by using the rotation-speed command voltage described above, or the duty ratio or the increase rate of the duty ratio, an example of performing the defrost determination by using the actual rotation number subjected to the feedback to the control board 31 from the outdoor fan motor 20 is described with reference to FIG. 11.

FIG. 11 is a diagram illustrating a relationship between the actual rotation number and the rotation-speed command voltage with respect to the target rotation number, by comparing cases of no frost formation and the large amount of frost formation.

The solid line represents the actual rotation number (rotation number subjected to the feedback from the outdoor fan motor) obtained in the case of the no frost formation, and is characterized in that the actual rotation number increases when the rotation-speed command voltage increases. In addition, the dashed line represents the actual rotation number obtained in the case of the large amount of frost formation when there is a very large amount of frost formation. As described above, in a case where the target rotation number is constant, (case where the rotation-speed command voltage is constant), the actual rotation number obtained during the frost formation decreases more than the actual rotation number obtained during the no frost formation. Hence, when the actual rotation number decreases more than a value on the dashed line with respect to a rotation-speed command voltage with respect to any target rotation number, the performance of the outdoor heat exchanger 14 is remarkably degraded due to excessive frost formation, and it is possible to determine that it is necessary to perform the defrost.

In other words, in the example, the actual rotation number in the case of the large amount of frost formation of the dashed line is a set value (defrost determination value) indicating that it is necessary to start the defrost operation and the actual rotation number in the case of no frost formation of the solid line is a set value (reference value) indicating that it is unnecessary to perform the defrost.

Determination of the frost formation and the defrost using the defrost determination value or the reference value is specifically described.

When the control board (control unit) 31 detects the frost formation, based on the actual rotation number that is received from the fan motor 20 during the heating operation, the control board controls the air conditioner such that the defrost operation of the outdoor heat exchanger 14 is started.

Since no frost is formed in the early stage of the heating operation in a case where the rotation-speed command voltage that is input to the inverter 21 is V1, an actual rotation number B1 that is received by the control board 31 is equal to the actual rotation number of the reference value (B1≅B1base). In a case where the actual rotation number decreases when the frost formation progresses, and the actual rotation number B1 that is received by the control board 31 is smaller than or equal to the defrost determination value (B1≤B1def), the control board 31 determines that the amount of frost formation increases to be large, and starts the defrost operation of the outdoor heat exchanger 14.

Here, in a case where the reference value (B1base) or the defrost determination value (B1def) are maintained as they are, and the rotation-speed command voltage with respect to the target rotation number of the outdoor fan 12 increases from V1 to V2, the actual rotation number that is received from the outdoor fan motor 20 increases to be larger than the actual rotation number of the reference value in the early stage of the heating operation (B2>B1base when the actual rotation number that is received from the fan motor is B2 in the case of V2). When the frost formation further progresses and the actual rotation number decreases, the actual rotation number is substantially equal to the reference value (B2≅B1base), and is not smaller than the defrost determination value (B2>B1def). Therefore, even when the frost formation progresses, the defrost is not started.

In order to prevent such a phenomenon from happening, in a case where the target rotation number changes, a reference value (B2base) and a defrost determination value (B2def) are set to correspond to the changed target rotation number. In other words, in an example illustrated in FIG. 11, the defrost determination value of the actual rotation number is set to increase as the speed command voltage with respect to the target rotation number of the outdoor fan 12 increases.

In other words, as illustrated in FIG. 11, the first reference value (B1base) and the second reference value (B2base) that is larger than the first reference value are set as the reference values of the no-frost-formation state, corresponding to the rotation-speed command voltage (V1) with respect to the first target rotation number and the rotation-speed command voltage (V2) with respect to the second target rotation number that is larger than the rotation-speed command voltage (V1) with respect to the first target rotation number of the fan motor 20, respectively.

In addition, the first defrost determination value (B1def) that is smaller than the first reference value (B1base) is set as the defrost determination value of the frost-formation state, corresponding to the rotation-speed command voltage (V1) with respect to the first target rotation number of the fan motor 20. Further, the second defrost determination value (B2def) that is smaller than the second reference value (B2base) and larger than the first defrost determination value (B1def) is set as the defrost determination value of the frost-formation state, corresponding to the rotation-speed command voltage (V2) with respect to the second target rotation number of the fan motor 20.

In a case where the actual rotation number of the fan motor 20 during the heating operation is equal to the rotation-speed command voltage (V1) with respect to the first target rotation number, the control board (control unit) 31 starts the defrost operation of the outdoor heat exchanger 14 in a case where the actual rotation number received from the fan motor 20 is smaller than or equal to the first defrost determination value (B1def). In addition, in a case where the actual rotation number of the fan motor 20 is equal to the rotation-speed command voltage (V2) with respect to the second target rotation number, in such a configuration, the defrost operation of the outdoor heat exchanger 14 is started in a case where the actual rotation number received from the fan motor 20 is smaller than or equal to the second defrost determination value (B2def).

Next, an example of calculation of the defrost determination value at the target rotation number, or the reference value and the defrost determination value in a case of a change in the target rotation number illustrated in FIG. 8, based on the rotation number or the rotation-speed command voltage of the outdoor fan motor 20 is described.

After the defrost operation, when the heating operation is resumed, the rotation-speed command voltage is equal to the rotation-speed command voltage (reference value) in the case of no frost formation that is represented by the solid line in FIG. 8. In other words, when the rotation-speed command voltage is A1 at a certain time point, "A1≅A1base". Note that the rotation-speed command voltage as the reference value may be stored in a storage unit of the control board (control unit) 31 in advance, or the rotation-speed command voltage after the end of the defrost may be replaced with the rotation-speed command voltage as the reference value. Further, the rotation-speed command voltage (defrost determination value) in the case of the large amount of frost formation that is represented by the dashed line in FIG. 8 may be stored in the storage unit of the control board 31, or may be obtained by using an increase rate of the rotation-speed command voltage with respect to the reference value, as expressed in Expression (2).

$$(A1\text{def}-\alpha)=K1\times(A1\text{base}-\alpha) \qquad (2)$$

Here, K1 represents the increase rate of the rotation-speed command voltage, and α represents an intercept in FIG. 8.

In a case where the outdoor fan 12 is subjected to step control, the reference value or the defrost determination value of the rotation-speed command voltage corresponding to each step may be stored in the storage unit of the control board 31 in advance. In addition, when the outdoor fan 12 is subjected to feedback control, the target rotation number continuously changes. Therefore, a problem of a memory capacity arises when the reference value or the defrost determination value is stored in the storage unit of the control board 31 for each target rotation number, and thus the reference value or the defrost determination value may be obtained by using the following Expressions (3) or (4).

$$(A2\text{base}-\alpha)=(A1\text{base}-\alpha)\times(f2/f1)^a \qquad (3)$$

$$(A2\text{def}-\alpha)=K2\times(A2\text{base}-\alpha) \qquad (4)$$

In the expression, a represents a real number, and K2 represents the increase rate the rotation-speed command voltage.

As expressed in Expression (3) above, it is possible to calculate the reference value assuming that the reference value is proportional to a rotation-number change rate raised by the exponent (exponent of a). In addition, as expressed in Expression (4), the defrost determination value may be obtained by calculating a value obtained by multiplying the reference value by the increase rate of the rotation-speed command voltage.

In other words, in the example, a storage unit that stores the first reference value (A1base) is provided, and it is possible to calculate the second reference value (A2base) as another reference value or the first defrost determination value (A1def), the second defrost determination value (A2def), and the like, by using Expressions (2) to (4) above, based on the reference value (A1base) stored in the storage unit and the rotation numbers (f1 and f2) of the outdoor fan motor 20.

Regarding the increase rate K2 of the rotation-speed command voltage, in a case where the outdoor fan 12 is subjected to the step control, the value (K2) corresponding to each step may be stored in the storage unit of the control board 31 in advance.

As described above, in a case where the outdoor fan 12 is subjected to the feedback control, the target rotation number continuously changes, and thus the problem of capacity arises even when the increase rate K2 of the rotation-speed command voltage is stored in the storage unit of the control board 31 for each target rotation number. Therefore, the increase rate K2 of the rotation-speed command voltage in Expression (4) is considered to be substantially equal to the increase rate K1 of the rotation-speed command voltage in Expression (2) (K2≅K1), and the same rate K1 may be used. In this manner, it is possible to avoid applying a burden to the memory capacity of the control board 31.

The control board 31 obtains the second reference value (A2base) by multiplying the first reference value (A1base) by rotation number correction, using Expression (3) above, and the second defrost determination value (A2def) is obtained by using Expression (4). Then, the rotation-speed command voltage value A2 during the heating operation is compared to the second defrost determination value (A2def), and the frost formation is detected. By comparison, the second reference value (A2base) may be obtained by performing the rotation number correction as expressed in Expression (3), and the rotation-speed command voltage A2 correction may be obtained by performing the rotation number correction on the rotation-speed command voltage A2 during the heating operation, as expressed in the next Expression (5) without obtaining the second defrost determination value (A2def) by using Expression (4) above. Then, the A2 correction may be compared to the first defrost determination value (A1def) and the frost formation may be detected.

$$(A2\ correction-\alpha)=(A2-\alpha)\times(f1/f2)^a \quad (5)$$

Note that, in the above description, the case of detecting the frost formation by using the "rotation-speed command voltage" illustrated in FIG. 8 is described; however, it is possible to perform detection even in a case where the frost formation is detected by using the duty ratio illustrated in FIG. 9 or the increase rate of the duty ratio illustrated in FIG. 10.

Next, an example of calculation of the defrost determination value corresponding to the rotation-speed command voltage with respect to the target rotation number illustrated in FIG. 11, or the reference value and the defrost determination value when the target rotation number changes, based on the rotation-speed command voltage with respect to the target rotation number or the actual rotation number of the outdoor fan motor 20.

After the defrost operation, when the heating operation is resumed, the actual rotation number subjected to the feedback from the fan is equal to the actual rotation number (reference value) in the case of no frost formation that is represented by the solid line in FIG. 11. In other words, when the actual rotation number subjected to feedback at a certain time point is B1, "B1≅B1base". Note that the actual rotation number as the reference value may be stored in the storage unit of the control board (control unit) 31 in advance, or the actual rotation number subjected to the feedback after the end of the defrost may be replaced with the actual rotation number as the reference value. Further, the actual rotation number (defrost determination value) in the case of the large amount of frost formation that is represented by the dashed line in FIG. 11 may be stored in the storage unit of the control board 31 in advance, or may be obtained by using a rotation-number decrease rate with respect to the reference value, as expressed in Expression (6).

$$(B1\mathrm{def}-\beta)=K3\times(B1\mathrm{base}-\beta) \quad (6)$$

Here, K3 represents the rotation-number decrease rate, and β represents an intercept in FIG. 11.

In the case where the outdoor fan 12 is subjected to step control, the reference value or the defrost determination value of the actual rotation number corresponding to each step may be stored in the storage unit of the control board 31 in advance. In addition, when the outdoor fan 12 is subjected to the feedback control, the target rotation number continuously changes. Therefore, a problem of a memory capacity arises when the reference value or the defrost determination value is stored in the storage unit of the control board 31 for each rotation-speed command voltage with respect to the target rotation number, and thus the reference value or the defrost determination value may be obtained by using the following Expressions (7) or (8).

$$B2\mathrm{base}=B1\mathrm{base}\times\{(\log_c V2+\beta)/(\log_c V1+\beta)\}^b \quad (7)$$

$$(B2\mathrm{def}-\beta)=K4\times(B2\mathrm{base}-\beta) \quad (8)$$

Here, b represents a certain real number, c represents a positive real number larger than 1, and K4 represents a rotation-number decrease rate.

As expressed in Expression (7) above, it is possible to perform conversion of the reference value, assuming that the reference value is proportional to a ratio raised by the exponent (exponent of b) in which the ratio is obtained by using log of the rotation number. In addition, as expressed in Expression (8), the defrost determination value may be obtained to be converted into a value obtained by multiplying the reference value by the rotation-number decrease rate.

In other words, in the example, a storage unit that stores the first reference value (B1base) is provided, and it is possible to calculate the second reference value (B2base) as another reference value or the first defrost determination value (B1def), the second defrost determination value (B2def), and the like, by using Expressions (6) to (8) above, based on the reference value (B1base) stored in the storage unit and the rotation-speed command voltages (V1 and V2) with respect to the target rotation number.

Regarding the rotation-number decrease rate K4, in a case where the outdoor fan 12 is subjected to the step control, the value (K4) corresponding to each step may be stored in the storage unit of the control board 31 in advance.

As described above, in a case where the outdoor fan 12 is subjected to the feedback control, the target rotation number continuously changes, and thus the problem of capacity arises even when the rotation-number decrease rate K4 is stored in the storage unit of the control board 31 for each target rotation number. Therefore, the rotation-number decrease rate K4 in Expression (8) above is considered to be substantially equal to the rotation-number decrease rate K3 in Expression (6) above (K4≅K3), and the same rate K3 may be used. In this manner, it is possible to avoid applying a burden to the memory capacity of the control board 31.

The control board 31 obtains the second reference value (B2base) by multiplying the first reference value (B1base) by correction, using Expression (7) above, and the second defrost determination value (B2def) is obtained by using Expression (8) above. Then, the actual rotation number B2 during the heating operation is compared to the second defrost determination value (B2def), and the frost formation is detected. By comparison, the second reference value (B2base) may be obtained by performing correction as expressed in Expression (7), and the actual rotation number B2 correction may be obtained by performing correction from the actual rotation number B2 during the heating operation, as expressed in the next Expression (9) without obtaining the second defrost determination value (B2def) by using Expression (8) above. Then, the B2 correction may be compared to the first defrost determination value (B1def) and the frost formation may be detected.

$$B2 \text{ correction} = B2 \times \{(\log_e V1 + \beta)/(\log_e V2 + \beta)\}^b \qquad (9)$$

According to Example 1 described above, it is possible to detect the frost formation on the outdoor heat exchanger during the heating operation without a current detecting sensor that detects the fan current. Therefore, it is possible to estimate the frost formation, to determine whether or not the defrost operation is necessary, and to perform a defrost operation at low costs. In addition, since it is possible to detect the amount of frost formation, similarly to a case where the fan current is detected such that the frost formation is determined, it is possible to appropriately determine the defrost, and further effects are achieved in that it is possible to determine the frost formation even in a case where it is not possible to detect the fan current in the vicinity of the outdoor control board 31.

Example 2

Next, Example 2 of the air conditioner of the present invention will be described with reference to the FIGS. 12 and 13. FIG. 12 is a diagram of a refrigeration cycle system illustrating Example 2 of the air conditioner according to the present invention, and FIG. 13 is a control block diagram illustrating control flow of the outdoor fan illustrated in FIG. 12.

In Example 1, as illustrated in FIG. 1 or 3, an example of a case where the outdoor fan inverter (fan inverter) 21 of the outdoor fan 12 is mounted inside the outdoor fan motor 20 is described; however, in Example 2, the outdoor fan inverter (inverter board) 21 of the outdoor fan 12 is not configured to be integral with the fan motor 20, and the outdoor fan inverter is positioned between the fan motor 20 and the outdoor control board 31 such that a separate board (inverter board) is provided, as illustrated in FIG. 12 or 13. Note that, since the other configurations are the same as those in Example 1 illustrated in FIG. 1, in FIG. 12, the description of the same portion is omitted.

As in Example 2, even when the outdoor fan inverter 21 as the inverter board is disposed to be separated from the fan motor 20, the present invention can perform the same operation.

The control flow of the outdoor fan 12 according to Example 2 is described with reference to FIG. 13. FIG. 13 illustrates flow for obtaining the target rotation number by performing the feedback of the actual rotation number of the outdoor fan 12 to the outdoor control board 31 and outputting a new speed command voltage for obtaining the target rotation number in a case where the inverter board (outdoor fan inverter) 21 is positioned between the outdoor control board 31 and the fan motor 20.

As illustrated in FIG. 13, the current actual rotation number (actual rotation speed) N1 is subjected to the feedback to the inverter board 21 from the outdoor fan motor 20. Information of the rotation number is retransmitted to the control board (control unit) 31 and the target rotation number (target rotation speed) N is compared to the received current actual rotation number N1 in the control board 31. When the difference between the numbers is larger than or equal to a certain value, the value of the duty ratio as the electrical signal that causes the actual rotation number of the fan motor 20 to approximate to the target rotation number, is generated and output. Based on the electrical signal, in the control board 31, voltage is converted into a rotation-speed command voltage obtained by increasing or decreasing the rotation-speed command voltage.

The rotation-speed command voltage is transmitted to the inverter board 21. Here, the speed command voltage and the DC voltage are converted into the three-phase AC voltage, and the three-phase AC voltage is transmitted to the outdoor fan motor 20. Since the fan motor 20 controls the rotation speed with the voltage, the fan motor receives the three-phase AC voltage, and then performs automatic processing on the voltage so as to adjust the rotation speed of the fan motor 20.

When the control is performed as illustrated in FIG. 13, as illustrated in FIG. 5 described above, the rotation-speed command voltage tends to increase as the frost formation progresses on the outdoor heat exchanger 14 and the amount of frost formation increases. Since the control board 31 generates the rotation-speed command voltage that increases as the amount of frost formation increases, a use of the generated rotation-speed command voltage enables estimation of the frost-formation state on the outdoor heat exchanger 14 by using the generated rotation-speed command voltage. Hence, in Example 2, it is also possible to employ a configuration in which, similar to Example 1, the control board 31 determines whether or not the rotation-speed command voltage exceeds the predetermined value set in advance, and the defrost operation is started.

As described in Example 2, even in a configuration in which the outdoor fan inverter 21 is positioned as a separate board between the fan motor 20 and the outdoor control board 31, it is possible to determine the frost formation by using the rotation-speed command voltage generated in the control board 31, it is possible to detect the frost formation at low costs without the need of the current detecting sensor for detecting the frost formation, and it is possible to achieve the same effects as those in Example 1.

Note that, even when the outdoor fan inverter 21 is mounted on the outdoor control board 31, the present invention can perform the same operations. In addition, in Example 2 described above, the example of determining the frost formation by using the rotation-speed command voltage is described; however, similar to the description in Example 1, it is also possible to detect the frost formation by using the duty ratio illustrated in FIG. 6 and to also detect the frost formation by using the increase rate of the duty ratio illustrated in FIG. 7. Further, FIGS. 8 to 11 described in Example 1 are also the same in Example 2, and thus the description thereof is omitted.

Also in Example 2 described above, it is possible to obtain the same effects of Example 1. In addition, in Example 1, since the fan inverter 21 is provided to be integral with the fan motor 20, the fan inverter 21 and the outdoor control board 31 are separately provided, and there is a merit that is possible to reduce deterioration in the function or malfunction, without interference with the electromagnetic waves generated from the board thereof.

By comparison, in Example 2, since the inverter board 21 is separately disposed between the outdoor control board 31 and the fan motor 20, a high degree of freedom of design is achieved, and there is a merit that is possible to achieve design in which the inverter board 21 is flexibly disposed in consideration of the performance or cost.

Note that the present invention is not limited to the examples described above, and the invention may include various modification examples. In addition, the examples described above are described in detail for easy understanding of the invention, and the invention is not necessarily limited to the example including the entire configurations in the description.

REFERENCE SIGNS LIST

1: air conditioner
10: outdoor device
11: compressor
12: outdoor fan
13: four-way valve
14: outdoor heat exchanger
15: outdoor expansion valve
20: outdoor fan motor (fan motor)
20a: fan shaft (rotary shaft)
21: outdoor fan inverter (fan inverter, inverter board)
31: outdoor control board (control board, control unit)
40: indoor device
41: indoor heat exchanger
42: indoor expansion valve

The invention claimed is:

1. An air conditioner comprising:
an outdoor heat exchanger;
an outdoor fan for blowing air to the outdoor heat exchanger;
an outdoor fan motor that drives the outdoor fan;
an outdoor fan inverter that drives the outdoor fan motor; and
a controller, connected to the fan inverter, that generates a rotation-speed command voltage for controlling a rotation number of the outdoor fan motor to be constant,
wherein an actual rotation number of the outdoor fan is subject to feedback to the fan inverter and the fan inverter transmits the actual rotation number to the controller,
wherein the controller compares the actual rotation number to a target rotation number of the outdoor fan and adjusts the rotation-speed command voltage by increasing or decreasing the rotation-speed command voltage based on the comparison of the actual rotation number and the target rotation number,
wherein the adjusted rotation-speed command voltage is output from the controller to the fan inverter and the fan inverter converts the adjusted rotation-speed command voltage and a DC voltage into AC voltage and the inverter outputs the AC voltage to the outdoor fan, and
wherein the controller, upon determining the adjusted rotation-speed command voltage is greater than a predetermined threshold, starts a defrost operation of the outdoor heat exchanger.

2. The air conditioner according to claim 1,
wherein, as the target rotation number of the outdoor fan increases, or as the rotation-speed command voltage with respect to the target rotation number of the outdoor fan increases, the predetermined value increases.

3. The air conditioner according to claim 1,
wherein the fan motor of the outdoor fan is provided with the outdoor fan inverter.

4. The air conditioner according to claim 1,
wherein a first reference value (A1base) and a second reference value (A2base) that is smaller than the first reference value are set as rotation-speed command voltages of a no-frost-formation state, corresponding to a first target rotation number (f1) and a second target rotation number (f2) that is smaller than the first target rotation number of the outdoor fan motor, respectively,
wherein a first defrost determination value (A1def) that is larger than the first reference value is set as a rotation-speed command voltage of a frost-formation state, corresponding to the first target rotation number of the outdoor fan motor, and further a second defrost determination value (A2def) that is larger than the second reference value and smaller than the first defrost determination value is set as a rotation-speed command voltage of a frost-formation state, corresponding to the second target rotation number of the outdoor fan motor, and
wherein the controller starts the defrost operation of the outdoor heat exchanger when the rotation number of the outdoor fan motor is equal to the first target rotation number during a heating operation and the rotation-speed command voltage is larger than or equal to the first defrost determination value, and the controller starts the defrost operation of the outdoor heat exchanger when the rotation number of the outdoor fan motor is equal to the second target rotation number and the rotation-speed command voltage is larger than or equal to the second defrost determination value.

5. The air conditioner according to claim 4, further comprising:
a memory of the controller that stores the first and second target rotation numbers, the first and second reference values, and the first and second defrost determination values,
wherein a reference value of a rotation-speed command voltage of a no-frost-formation state and a defrost determination value of a rotation-speed command voltage of a frost-formation state, which corresponds to target rotation numbers other than the target rotation number stored in the storage unit, are calculated, based on the target rotation numbers, the reference values, and the defrost determination values stored in the memory.

6. An air conditioner comprising:
an outdoor heat exchanger;
an outdoor fan for blowing air to the outdoor heat exchanger;
an outdoor fan motor that drives the outdoor fan;
an outdoor fan inverter that drives the outdoor fan motor; and a controller, connected to the fan inverter, that generates a rotation-speed command voltage for controlling a rotation number of the outdoor fan motor to be constant, wherein an actual rotation number of the outdoor fan is subject to feedback to the fan inverter and the fan inverter transmits the actual rotation number to the controller, wherein the controller compares to the actual rotation number to a target rotation number of the outdoor fan and adjusts the rotation-speed command voltage by increasing or decreasing the rotation-speed command voltage based on the comparison of the actual number and the target rotation number wherein the adjusted rotation-speed command voltage is output from the controller to the fan inverter and the fan inverter converts the adjusted rotation-speed command voltage and a DC voltage into AC voltage and the inverter outputs the AC voltage to the outdoor fan, and wherein the controller, upon determining a duty ratio for generating the rotation-speed command voltage is greater than a predetermined threshold, starts the defrost operation of the outdoor heat exchanger.

7. The air conditioner according to claim 6, wherein a first reference value (C1base or D1base) and a second reference value (C2base or D2base) that is smaller than the first reference value are set as duty ratios or respective increase rates of a duty ratio of a no-frost-formation state, corresponding to a first target rotation number (m1 or n1) and a second target rotation number (m2 or n2) that is smaller than the first target rotation number of the outdoor fan motor, respectively, wherein a first defrost determination value (C1def or D1def) that is larger than the first reference value is set as a duty ratio or an increase rate of a duty ratio of a frost-formation state, corresponding to the first target rotation number of the outdoor fan motor, and further a second defrost determination value (C2def or D2def) that is larger than the second reference value and smaller than the first defrost determination value is set as a duty ratio or an increase rate of a duty ratio of a frost-formation state, corresponding to the second target rotation number of the outdoor fan motor, and wherein the controller starts the defrost operation of the outdoor heat exchanger when the rotation number of the outdoor fan motor is equal to the first target rotation number during a heating operation and the duty ratio or the increase rate of the duty ratio is larger than or equal to the first defrost determination value in the frost-formation state, and the controller starts the defrost operation of the outdoor heat exchanger when the rotation number of the outdoor fan motor is equal to the second target rotation number and the duty ratio or the increase rate of the duty ratio is larger than or equal to the second defrost determination value in the frost-formation state.

8. The air conditioner according to claim 7, further comprising:

a memory of the controller that stores the first and second target rotation numbers, the first and second reference values, and the first and second defrost determination values, wherein a reference value of a duty ratio or an increase rate of a duty ratio of a no-frost-formation state and a defrost determination value of a duty ratio or an increase rate of a duty ratio of a frost-formation state, which corresponds to target rotation numbers other than the target rotation number stored in the memory, are calculated, based on the target rotation numbers, the reference values, and the defrost determination values stored in the memory.

* * * * *